Sept. 15, 1964          W. R. BENNETT, JR., ETAL          3,149,290
                            GAS OPTICAL MASER
                           Filed Dec. 28, 1960
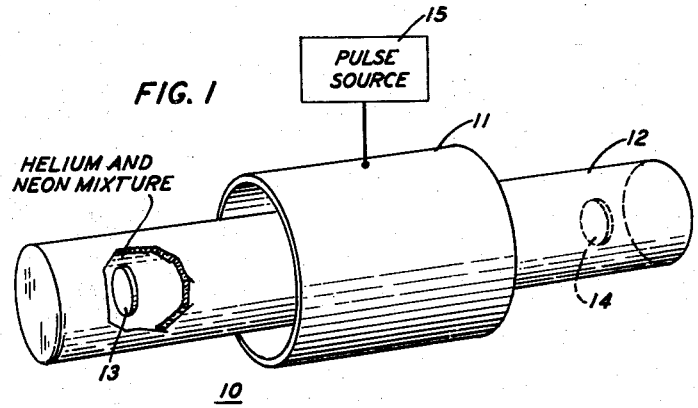
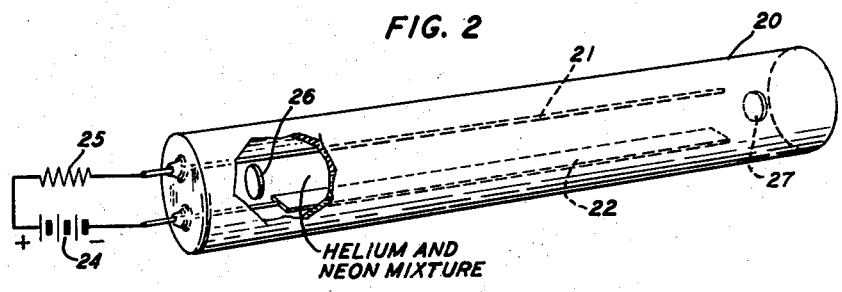
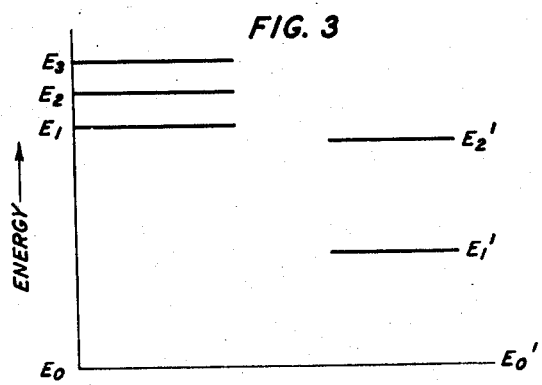
INVENTORS  W. R. BENNETT, JR.
           A. JAVAN
BY
           Arthur J. Torsiglieri
                    ATTORNEY

United States Patent Office 3,149,290
Patented Sept. 15, 1964

3,149,290
GAS OPTICAL MASER
William R. Bennett, Jr., and Ali Javan, Berkeley Heights, N.J., assignors to Bell Telephone Laboratories, Incorporated, New York, N.Y., a corporation of New York
Filed Dec. 28, 1960, Ser. No. 79,062
5 Claims. (Cl. 331—94.5)

This invention relates to an optical maser, in particular to an optical maser using a mixture of gases as the negative temperature medium.

This invention relates to optical masers utilizing a gaseous medium as the negative temperature medium of the kind described in copending application Serial No. 816,276, filed May 27, 1959, by Ali Javan, and now abandoned, in which a population inversion or negative temperature is established in a gaseous mixture by the transfer of energy from molecules of one gas to another by means of a collision mechanism. In particular, in the optical maser there described the gaseous mixture which serves as the active medium comprises two gases A and B. Gas A is chosen to have an energy level $E_1$ above the ground state $E_0$ which is metastable, i.e., an atom raised to state $E_1$ tends to remain in that state a long time, seconds, rather than returning to the ground state or dropping to some intermediate state. Gas B is chosen to have a state $E_2'$ whose level is matched to that of state $E_1$ of gas A and at least one state at a level $E_1'$ intermediate between level $E_2'$ and its ground state $E_0'$. When the mixture is placed in a radiation field so that partial ionization of gas A occurs, free electrons of relatively high energies are produced. These free electrons by collision processes excite to higher states un-ionized atoms predominantly of gas A but incidentally also of gas B. In particular, atoms of gas A tend to be excited predominantly to level $E_1$, either directly or by relaxation to that state from a higher state to which they were excited. As a consequence, state $E_1$ becomes relatively heavily populated. Moreover, when atoms of gas A in state $E_1$ collide with ground state atoms of gas B, some of the latter will be excited to level $E_2'$. Because such transfer excitation can occur only between colliding atoms whose energy levels are closely matched, as are levels $E_1$ and $E_2'$, state $E_2'$ alone of the states of gas B will experience a significant increase in population by the collision process. By virtue of this selective excitation of level $E_2'$, there can be established a population inversion or negative temperature between this level $E_2'$ and level $E_1'$ so long as the partial decay rates of levels $E_1'$ and $E_2'$ are appropriate. This permits the stimulation of emission of radiation of frequency $$\frac{E_2' - E_1'}{h}$$

where $h$ is Planck's constant. If this frequency is the optical range, as can be arranged by appropriate choice of the two gases, an optical maser results.

We have now found that there are various processes which can compete with the desired one and thereby result in a reduction in its efficiency.

The present invention in some respects is based on a recognition of these difficulties and on their elimination.

In particular, it has been found that the energetic electrons continuously being created by the ionization of gas A inhibit the efficient formation of the desired population inversion either by promoting reactions which increase the population of level $E_1'$ or by accelerating reactions which tend to restore the system to equilibrium. For example, the collision of such electrons with un-ionized atoms of gas B tends to excite some such atoms to state $E_1'$ and thereby to upset the population inversion desired.

It is a feature of the present invention that measures are utilized for reducing the influence of such electrons in affecting undesirably the efficiency of the population inversion process.

In a first embodiment to be described, the desired end is achieved by pulsing appropriately the radiation used to cause the ionization of gas A so that ionization of gas A and creation of high energy free electrons is periodic. This technique proves advantageous because by appropriate choice of gases the lifetime of atoms in metastable state $E_1$ can be considerably longer than the lifetime of the free electrons.

In a second embodiment to be described, free electrons are removed from the region of un-ionized atoms by an electric field and the maser operation is achieved in a region free of energetic electrons.

The invention will be better understood from the following more detailed description, taken in conjunction with the accompanying drawing, in which:

FIG. 1 shows schematically, partly in section, an embodiment of the invention involving periodic ionization as discussed;

FIG. 2 shows schematically, partly in section, an embodiment involving separation of the free electrons from un-ionized atoms as discussed; and FIG. 3 is an energy level diagram illustrating energy relationships important to one embodiment of the invention.

With reference now more particularly to the drawing, in FIG. 1 the maser 10 comprises a cylindrical cavity 11 resonant at the radio frequency to be used for ionization of the gas. Typically, the cavity may be resonant in the circular $TM_{01}$ mode, for example, at 2,000 megacycles. There extends coaxially through the cavity an elongated cylindrical envelope 12, typically of glass and of about one-half inch inner diameter and a foot long, transparent both to the microwave energy in the cavity and the light to be generated. The gas mixture of two gases which serves as the active medium is enclosed within the envelope. The concentration of each gas is made sufficiently large that the mean free paths of the gas molecules are short enough to encourage collisions between molecules in preference to collisions of the molecules with the envelope walls, or more particularly that the diffusion rates are small compared to the collision transfer rates. Advantageously, the concentrations are sufficiently high that the mean free path of each of the gases is no more than a small fraction, for example, one one-hundredth of the internal dimensions of the envelope. By way of example, in the preferred embodiment the envelope encloses helium and neon, the helium concentration corresponding to a pressure of about ten millimeters of mercury and the neon concentration to a pressure of about 0.1 millimeters of mercury.

It is characteristic of helium that it includes an energy state $E_1$ corresponding to the $2^3S_1$ level (in the LS designation) that is metastable. In addition, there are included higher energy levels $E_2$, $E_3$, et cetera, that are not metastable but which instead exhibit a high rate of decay to level $E_1$.

Accordingly, by the application of sufficient radio frequency energy to the helium to produce ionization thereof, collision of free electrons produced by such ionization with un-ionized helium atoms tends to increase the population of helium atoms in level $E_1$ to a relatively high value. The relevant portion of the energy diagram of helium is shown in FIG. 3.

Additionally, in FIG. 3 there is shown the relevant portion of the energy diagram of neon. In particular, neon includes a level $E_2'$ corresponding to the $2s_5$ state (in Paschen notation) whose separation from its ground state $E_0'$ substantially matches the separation between levels $E_0$ and $E_1$ of helium. Neon also includes level $E_1'$ corresponding to the $2p_9$ state (in Paschen notation) which is intermediate between levels $E_0'$ and $E_2'$ and whose separation from the latter level corresponds to a wavelength in the near infrared optical range.

It will be characteristic of the system described that the neon population of level $E_2'$ will tend to reach thermal equilibrium with the helium population of level $E_1$ by inelastic collision processes because each corresponds to essentially the same energy. This means that the fraction of the neon population in state $E_2'$ will approach the fraction of the helium population in state $E_1$. The other neon levels, such as $E_1'$, will be little affected by the helium. As a consequence, the buildup of the helium population of level $E_1$ can be used selectively to build up the neon population of level $E_2'$ whereby such latter population can be made to exceed the neon population of level $E_1'$ whereby a population inversion or negative temperature can be established between levels $E_2'$ and $E_1'$.

For the utilization of the negative temperature for maser action, it is important to provide for the stimulated, rather than spontaneous, emission of radiation of the wavelength corresponding to the negative temperature. To this end, it is important to set up standing waves at this wavelength in the gas chamber. Typically, such a standing wave pattern can be achieved by positioning reflective members 13, 14 at opposite ends of the envelope. Such reflective members serve a role analogous to the Fabry-Perot plates useful in interferometers. These members can be planar and parallel as described in the aforementioned copending Javan application, or they may be a pair of confocal spherical elements or one may be planar and the other spherical.

In particular, the elements are coated to be highly selectively reflective of energy of the wavelength of interest, although element 14 is made to transmit some, typically from one to five percent, of the energy of the desired wavelength for utilization, either by permitting some transmission through its coating or by providing an opening in the coating. Advantageously, to this end each of the elements is coated with a plurality of layers of a dielectric material of appropriate thickness that the element reflects energy of the wavelength of the stimulated emission and transmits energy of other wavelengths. In this way each element serves as a filter, confining only energy of appropriate wavelength whereby the buildup of undesired oscillations is restrained.

The reflective elements can be included either within the envelope as shown or without. Alternatively, the reflective elements can be made integral with the envelope.

If desired, a lens arrangement may be positioned in the path of the light transmitted through the partially transmitting element 14 for bringing such light to a focus at some desired point.

There have been omitted from the drawing details such as gas inlet, vacuum equipment, supports and spacers to maintain the elements shown fixed in their required position and cooling equipment for keeping the temperature of the envelope from increasing unduly.

As previously described, an improvement of the instant invention comprises pulsing the microwave energy supplied to the cavity for ionizing the medium. As a consequence, there is reduced the deleterious effect of the free electrons produced by such ionization. To this end, the microwave cavity is shown excited from a source of microwave pulses 15. Typically, microwave power of the order of a hundred watts should be supplied.

As radio frequency energy in supplied to the resonant cavity, ionization of the gases occurs within the chamber as each pulse is applied. The density of free electrons will then quickly become high and hence the concentrations of gas A metastables will increase. The reactions which inhibit maser action will also take place. However, when the pulse ends the radiation field is removed, so that free electrons are no longer produced. Once the continuous production of these high energy electrons is halted, the existing electrons quickly lose their high energies and become incapable of initiating excitation reactions. However, since the lifetime of the helium metastables in level $E_1$ can be several orders of magnitude longer than that of the high energy electrons, the reaction which excites the neon atoms to level $E_2'$ can continue to occur, even after ionization of the helium and production of free electrons has stopped. As long, therefore, as there is an appreciable number of the helium metastables present in the envelope, the population of the upper state of the levels between which the negative temperature exists will continue to be greater than the population of the lower because of the continuous process of collision excitation by which energy is transferred from the metastable level of helium to the appropriate level of neon. After a time, however, of the order of milliseconds, in the absence of any application of added radio frequency energy, the number of helium metastables will be reduced to the point where the excitation of neon can no longer be maintained. In order that the emission of radiation from the gaseous medium be substantially continuous, the succeeding pulse should be timed to occur before the excitation of neon has ceased. Then, the rapid increase in the number of helium metastables, which arises from the high electron density stemming from ionization by the radio frequency field will, through the collision excitation process, maintain the population of the excited neon at a level such that radiation may be substantially continuously stimulated.

Alternatively, a maser capable of intermittent operation results when the pulses are applied at intervals long enough so that the number of helium metastables drops to the point where neon atoms of level $E_2'$ are no longer produced at a rate faster than they decay. In both cases, improved operation is achieved during the time the metastable atoms of helium exist in the absence of energetic electrons.

In another example, operation was achieved by supplying about one hundred watts at twenty-nine megacycles to a mixture in which the neon pressure was about 100 microns of mercury and the helium pressure about one millimeter of mercury.

FIG. 2 shows an alternative embodiment more conveniently operated on a continuous basis. As in the maser previously described, the envelope 20, typically of glass, houses a mixture of gases whose energy systems have characteristics of the kind shown in FIG. 3. Typically, such a mixture can comprise helium at between one and ten millimeters of mercury pressure and neon at between .01 and .5 millimeter of mercury pressure. The envelope also houses a pair of electrodes 21 and 22 which define between them an ionization space. As shown, electrode 21 comprises a wire and electrode 22 a plate, electrode 21 being positioned parallel and opposite the center of the plate. Typically, electrode 21 can be about six inches long and thirty mils diameter and electrode 22 six inches long and two inches wide. The spacing can be about one inch. Lead-in conductors are provided by means of which an ionizing potential difference can be established between the two electrodes. To this end, voltage source 24 is shown connected between the two electrodes. Typically, the voltage source is made to provide a D.C. voltage of about one hundred volts. A current limiting resistor 25 is also connected in the circuit.

To establish the standing wave pattern, the envelope also includes reflective elements 26 and 27 of the kind previously described at opposite ends of the ionization space, typically about eight inches apart.

In this embodiment, the voltage source serves to ionize some helium atoms in the mixture and the resultant energetic free electrons excite other un-ionized helium atoms to the metastable state. Such energetic electrons are largely confined by the electric field in the ionization space to the neighborhood of the positively charged electrode, which is preferably electrode 21. However, un-ionized atoms are uninfluenced by the electric fields and diffuse freely. As a consequence, there tends to be a buildup in that portion of the ionization space adjacent electrode 22 a concentration of un-ionized atoms of which a sufficient number are neon atoms in the excited $E_2'$ state and maser action occurs as previously described.

It can be appreciated that various electrode configurations are feasible. For example, each of the two electrodes can be a wire. The arrangement described has the advantage of providing a localized region of higher electric field. When such a configuration is employed, a D.-C. voltage source loses its advantage and A.-C. sources can be used provided the frequency is sufficiently low that a period of the oscillation is long compared to the relaxation time of the free electrons whereby spatial separation of the free electrons by the electric field becomes feasible.

There are various subsidiary problems for achieving efficient operation in masers of the kind shown in FIG. 1. In particular, when the reflecting elements used for establishing the standing wave pattern in the active medium are planar as shown, it is important to insure that they are positioned to be parallel to one another with a high degree of accuracy.

To this end, one convenient technique is as follows: First, the elements are adjusted to be parallel as accurately as possible by conventional methods, such as by the use of an autocollimating telescope. Then the elements are oscillated about orthogonal axes each at a different frequency at a very slow rate until maser action is detected as by the emission of a high intensity highly directional light beam. The oscillations can be achieved by driving the elements by magnetostrictive transducers. By applying voltages proportional to the positions of the elements to the vertical and horizontal plates of an oscilloscope and by modulating the intensity of the oscilloscope beam with the maser output, the positions of the two elements for optimum operation can be readily determined.

There are various other mechanisms by which metastable levels can be produced by collision processes. In particular, such levels can be formed by impact with high energy particles, such as alpha particles, from radioactive isotopes. In the embodiment of FIG. 2, for example, the electrode 21 may be coated with a layer of a radioactive material which emits alpha particles. In such a device, of course, the voltage of source 24 need not exceed the ionization potential of the gaseous medium. In fact, the production of high energy free electrons may be so far reduced that no voltage at all need be applied.

The formation of metastable atoms occurs largely through indirect processes, which are nevertheless highly efficient. In helium, direct excitation by the high energy particles is confined to the production of singlet excited states of helium, helium ions and free electrons of medium energy. Production of the triplet levels (either the triplet metastable or triplet states which radiate to the $2^3S$) arises from excitation by the medium energy electrons, recombination of ions and electrons, exchange collisions between excited singlets and free electrons, and inelastic collision transfer between excited singlet states and ground state atoms. For example, a few Curies of polonium 210 will provide enough alpha particles to produce $10^{16}$ helium metastables per second.

The use of radioactivity has several advantages. There is no need for the application of voltages to the medium, and this makes possible a compact unit free of external equipment such as would prove advantageous in space communication systems. In addition, the absence of applied voltages in excess of the ionization potential eliminates the production of a relatively high density of energetic electrons which occurs when the plasma is heated by a discharge. Hence the use of radioactivity produces a condition similar to that present in the afterglow of the pulsed discharge technique described above. Hence the use of radioactivity may permit continuous wave operation.

As still another technique, use can be made of the fact that in the process of radiative recombination of an atomic ion with an electron, the electron is preferentially captured in highly excited states of the resultant atom, and the atom subsequently decays into its ground state by radiative cascade. In a medium where this effect is the predominant source of atomic excitation, a population inversion can occur between two energy levels lying below the initial one provided that the decay rate of the upper of these two levels is slower than that of the lower.

Such a result can be achieved with a mixture of helium and mercury. In such a mixture when ionized the mercury ion density is particularly large due to ionizing collisions between mercury atoms and helium atoms in the $(2^3S)$ state. In particular, one pair of energy levels in atomic mercury suitable for the production of a population inversion consists of the $(7^1S)$ state and the $(6^1P)$ state with a separation of 10,180 Angstrom units. With such a medium, the use of a pulsed discharge is also particularly advantageous since the prompt thermalization of energetic electrons minimizes the direct excitation of low lying mercury levels by electron impact which upsets the population inversion. Moreover, recombination occurs more rapidly with thermalized electrons than with energetic ones. A helium-mercury mixture also permits operating conditions in which the impurity ions are dominantly atomic, rather than molecular, in nature. This is desirable because the dissociative recombination process occurring with molecular ions favors the production of undesirable lower lying atomic states.

Typically, the cross section for desired nonradiative transfer in two-body collisions is largest when the energetic resonance discrepancies between the initial and final electronic states are smallest. Thus, the largest transfer probabilities occur when this energy difference is of the order of, or smaller than, the kinetic energy of the atoms at room temperature. In many cases, the advantage of these large transfer cross sections may be lost through the action of the inverse process and competing mechanisms for the destruction of the excited state of the initial carrier of energy. The adverse effect of the inverse process can be eliminated either by cooling the gas sufficiently to insure that the mean kinetic energy is substantially less than the energetic resonance discrepancy or by selecting transfer processes that are irreversible at the operating temperature.

Alternatively, operation with a single gas species is possible by choosing a gas whose energy system is characterized by a level of relatively high energy value and a set of close lying levels with low energy values such that the lower levels of the set provide a basis for depopulating a higher level within the set.

For example, neon is characterized by a set of close lying levels $1s_2$, $1s_3$, $1s_4$ and $1s_5$ of relatively low energies of which levels $1s_5$ and $1s_3$ are metastable and levels $1s_4$ and $1s_2$ are quasi-metastable becoming metastable at pressures above 100 microns. Accordingly, at such pressures each of the states is long-lived. Additionally, each can be heavily populated in a gas discharge.

Neon also includes a different set of close lying levels $2p_{10}$, $2p_9$ . . . $2p_1$ which set has energy values higher than that of the set consisting of $1s_5$ . . . $1s_2$.

In discharges of low electron densities, these levels have short radiative lifetimes and so these levels will not become heavily populated. However, by increasing the electron density to the point where the rate of inelastic collision of electrons with the set of $2p$ levels becomes comparable to their rate of radiative decay, these levels can be populated appreciably.

If the neon gas pressure also is increased to a point where the inelastic collision of the second kind between atoms leading to a transfer of excitation within closely spaced levels becomes important, the population distribution among closely spaced levels such as the $1s$ or $2p$ sets tends to pile up in the lowest levels, the higher levels within a set being depopulated. In particular, the $1s_1$ level will tend to be depopulated whereas the $2p_{10}$ level will tend to be populated whereby the population of the $2p_{10}$ level can be made to exceed that of the $1s_1$ level whereby an inverted population distribution results which is useful for maser action in the usual fashion.

In the light of the various mechanisms described, it is to be understood that the specific embodiments described are merely illustrative of the general principles of the invention, and modified versions may be devised without departing from the spirit and scope of the invention. In particular, other gas mixtures are possible which permit maser operation by one of the mechanisms discussed. For example, krypton may be employed as the exciting gas and mercury as the excited gas. Similarly, it is feasible to include for quenching purposes still another gas. For example, in the helium-neon system described, the addition of argon, typically at a pressure of about one percent that of the neon pressure, makes feasible high power operation.

What is claimed is:

1. An optical maser comprising an active medium consisting of a first and a second gas, the first gas having a metastable energy level above its ground state and the second gas having at least two levels above the ground state, the separation of the higher of said two levels from the ground state substantially matching the separation of said metastable level from its ground state, means for housing said active medium, means for producing free electrons in said medium for colliding with and raising atoms of the first gas to the metastable state, said atoms in the metastable state being effective to transfer energy by inelastic collisions of the second kind to the matching energy level of the second gas, said energy transfer proceeding at a rate sufficient to produce a negative temperature state in said second gas, means for substantially lessening the interaction of free electrons with the active medium in which a negative temperature is produced by reducing the concentration of free electrons in a region wherein there exists a substantial concentration of metastable atoms of said first gas or of atoms of said second gas in the higher of said energy levels, means for establishing a standing wave of the frequency corresponding to the separation of said two levels above the ground state of the second gas and means for utilizing emitted radiation of said frequency.

2. An optical maser comprising a first and a second gas within an interaction space, the first gas possessing a metastable level above its ground state and the second gas possessing an energy level system with at least two levels above the ground state, the separation of the higher of said two levels from the ground state substantially matching the separation of said metastable level of the first gas from its ground state, metastable atoms of the first gas being effective to transfer energy by inelastic collisions of the second kind to the matching energy level of the second gas, means for producing a pulsed discharge through said interaction space, the intervals between the pulses being greater than the time in which the free electrons produced by a discharge lose excess energy and reach thermal equilibrium, the transfer of excitation energy by collision between the metastable atoms of the first gas and the atoms of the second gas proceeding without interference in said interval at a rate sufficient to produce a population inversion in said second gas and enabling the stimulation of coherent radiation of a frequency corresponding to the separation of the said two levels above the ground state, means for forming standing waves of the emitted coherent radiation comprising reflecting means positioned about the interaction space, and means for abstracting a portion of the emitted radiation from said space.

3. The optical maser of claim 2 in which the first gas is helium and the second gas is neon.

4. An optical maser comprising a first and a second gas within an enclosed space, the first gas possessing a metastable level above its ground state and the second gas possessing an energy level system with at least two levels above the ground state, the separation of the higher of said two levels from the ground state substantially matching the separation of said metastable level of the first gas from its ground state, metastable atoms of the first gas being effective to transfer energy by inelastic collisions of the second kind to the matching energy level of the second gas, thereby creating a population inversion between a pair of levels and enabling the stimulation of coherent radiation of a frequency corresponding to the separation of the said two levels above the ground state, means for producing free electrons within the enclosed space so that ground state molecules of the first gas will be raised to the metastable state, means for confining said free electrons to a small region of the enclosed space, means for forming standing waves of said coherent radiation emitted from the region of the enclosed space from which free electrons are excluded, and means for extracting said coherent radiation for utilization.

5. An optical maser comprising a first and a second gas within an interaction space, the first gas possessing a metastable level above its ground state and the second gas possessing an energy level system with at least two levels above the ground state, the separation of the higher of said two levels from the ground state substantially matching the separation of said metastable level of the first gas from its ground state, molecules of the first gas which are in the metastable state being effective to transfer energy by inelastic collisions of the second kind to the matching energy level of the second gas, thereby creating a population inversion between a pair of levels and enabling the stimulation of coherent radiation of a frequency corresponding to the separation of the said two levels above the ground state, means for establishing within said space a strongly inhomogeneous electric field, free electrons produced by ionization of gas atoms colliding with unionized atoms of the first gas and exciting them to the metastable state, said electric field also serving to confine charged particles within a small region of said space and to allow uncharged particles to diffuse into the low field region of said space, means for producing standing waves in said region at the wavelength corresponding to the separation of said two levels above the ground state, and means for extracting the coherent radiation emitted from the said low field region.

References Cited in the file of this patent

UNITED STATES PATENTS

| 2,851,652 | Dicke | Sept. 9, 1958 |
| 2,929,922 | Schawlow et al. | Mar. 22, 1960 |
| 2,965,795 | Norton | Dec. 20, 1960 |
| 3,059,117 | Boyle et al. | Oct. 16, 1962 |

OTHER REFERENCES

Bennett: "Applied Optics—Supplement on Optical Masers," 1962, pages 24–61.

UNITED STATES PATENT OFFICE
Certificate

Patent No. 3,149,290            Patented September 15, 1964

William R. Bennett, Jr., and Ali Javan

Application having been made by William R. Bennett, Jr., and Ali Javan, the inventors named in the patent above identified, and Bell Telephone Laboratories, Incorporated, New York, N.Y., a corporation of New York, the assignee, for the issuance of a certificate under the provisions of Title 35, Section 256, of the United States Code, adding the name of Donald R. Herriott as a joint inventor, and a showing and proof of facts satisfying the requirements of the said section having been submitted, it is this 22nd day of December 1970, certified that the name of the said Donald R. Herriott is hereby added to the said patent as a joint inventor with the said William R. Bennett, Jr., and Ali Javan.

FRED W. SHERLING
*Associate Solicitor.*